(12) United States Patent
Puri et al.

(10) Patent No.: US 8,995,306 B2
(45) Date of Patent: Mar. 31, 2015

(54) VIDEO CONFERENCING WITH MULTIPOINT CONFERENCING UNITS AND MULTIMEDIA TRANSFORMATION UNITS

(75) Inventors: Rohit Puri, Campbell, CA (US); Jim Chou, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 13/066,086

(22) Filed: Apr. 6, 2011

(65) Prior Publication Data
US 2012/0260122 A1 Oct. 11, 2012

(51) Int. Cl.
| | |
|---|---|
| *H04L 12/16* | (2006.01) |
| *H04Q 11/00* | (2006.01) |
| *H04N 21/2343* | (2011.01) |
| *H04L 1/00* | (2006.01) |
| *H04L 12/18* | (2006.01) |
| *H04N 7/15* | (2006.01) |
| *H04N 21/2365* | (2011.01) |
| *H04N 21/262* | (2011.01) |
| *H04L 29/06* | (2006.01) |

(52) U.S. Cl.
CPC .......... *H04N 21/2343* (2013.01); *H04L 1/0041* (2013.01); *H04L 1/0045* (2013.01); *H04L 1/0057* (2013.01); *H04L 12/1822* (2013.01); *H04N 7/15* (2013.01); *H04N 21/2365* (2013.01); *H04N 21/26275* (2013.01); *H04L 65/605* (2013.01); *H04L 12/1863* (2013.01); *H04L 65/403* (2013.01); *H04L 2001/0096* (2013.01)
USPC ............ 370/260; 370/261; 370/262; 709/204

(58) Field of Classification Search
CPC ... H04L 1/0041; H04L 1/0045; H04L 1/0057; H04L 12/1822; H04L 65/403; H04L 65/605; H04L 12/1863; H04N 21/2343; H04N 21/2365; H04N 21/26275; H04N 7/15
USPC ................... 370/260–262; 709/203–204, 219
See application file for complete search history.

(56) References Cited

U.S. PATENT DOCUMENTS

| | | | |
|---|---|---|---|
| 6,944,123 B1 | 9/2005 | Moon | |
| 7,089,285 B1 * | 8/2006 | Drell | 709/204 |
| 7,343,101 B1 * | 3/2008 | Frankel et al. | 398/158 |

(Continued)

FOREIGN PATENT DOCUMENTS

EP  1 039 734 A2  9/2000

OTHER PUBLICATIONS

Kon F et al:"Using dynamic configuration to manage a scalable multimedia distribution system",Computer Comm, Elsevier Science Pub BV, Amsterdam,NL,vol. 24,No. 1, Jan. 1, 2001.

(Continued)

*Primary Examiner* — Chuong T Ho
(74) *Attorney, Agent, or Firm* — Cindy Kaplan

(57) ABSTRACT

In one embodiment, a method includes receiving at a multimedia transformation unit, media streams from a plurality of endpoints, transmitting audio components of the media streams to a multipoint conferencing unit, receiving an identifier from the multipoint conferencing unit identifying one of the media streams as an active speaker stream, processing at the multimedia transformation unit, a video component of the active speaker stream, and transmitting the active speaker stream to one or more of the endpoints without transmitting the video component to the multipoint conferencing unit. An apparatus is also disclosed.

13 Claims, 7 Drawing Sheets

(56) References Cited

U.S. PATENT DOCUMENTS

| | | | |
|---|---|---|---|
| 7,627,629 B1 | 12/2009 | Wu et al. | |
| 7,957,307 B2 * | 6/2011 | Qiu et al. | 370/252 |
| 2002/0038441 A1 * | 3/2002 | Eguchi et al. | 714/748 |
| 2004/0207724 A1 * | 10/2004 | Crouch et al. | 348/14.09 |
| 2005/0204242 A1 | 9/2005 | Chou et al. | |
| 2005/0248652 A1 | 11/2005 | Firestone et al. | |
| 2006/0092269 A1 | 5/2006 | Baird et al. | |
| 2007/0014360 A1 * | 1/2007 | Botzko et al. | 375/240.16 |
| 2007/0064901 A1 * | 3/2007 | Baird et al. | 379/202.01 |
| 2007/0070182 A1 * | 3/2007 | Ryu et al. | 348/14.02 |
| 2007/0156924 A1 | 7/2007 | Ramalingam et al. | |
| 2007/0165842 A1 * | 7/2007 | Lecomte et al. | 380/28 |
| 2008/0022340 A1 | 1/2008 | Hannuksela et al. | |
| 2008/0046585 A1 * | 2/2008 | Blumofe | 709/231 |
| 2008/0225735 A1 * | 9/2008 | Qiu et al. | 370/252 |
| 2008/0266383 A1 | 10/2008 | Shah et al. | |
| 2008/0266384 A1 | 10/2008 | Triplicane et al. | |
| 2008/0267078 A1 | 10/2008 | Farinacci et al. | |
| 2008/0267282 A1 | 10/2008 | Kalipatnapu et al. | |
| 2009/0160929 A1 | 6/2009 | Wu et al. | |
| 2009/0174764 A1 | 7/2009 | Chadha et al. | |
| 2009/0180613 A1 * | 7/2009 | LeComte et al. | 380/210 |
| 2009/0327842 A1 | 12/2009 | Liu et al. | |
| 2010/0195741 A1 | 8/2010 | Chou et al. | |
| 2010/0302345 A1 | 12/2010 | Baldino et al. | |
| 2010/0302446 A1 | 12/2010 | Mauchly et al. | |
| 2011/0158343 A1 * | 6/2011 | Park et al. | 375/285 |
| 2012/0029911 A1 * | 2/2012 | Noh et al. | 704/201 |

OTHER PUBLICATIONS

Reha Civanlar M et al:"IP-Networked Multimedia Conferencing",IEEE Signal Processing Magazine,Piscataway,NJ,US,vol. 17,No. 4,pp. 31-43, Jul. 1, 2000.

* cited by examiner

VIDEO CONFERENCING WITH MULTIPOINT CONFERENCING UNITS AND MULTIMEDIA TRANSFORMATION UNITS

TECHNICAL FIELD

The present disclosure relates generally to communication networks, and more particularly, to video conferencing.

BACKGROUND

Video conferencing provides real-time, face-to-face interactions between people from distributed geographic locations and has become increasingly popular as a way to reduce travel expenses and enhance collaboration. Conventional video conferencing systems often use a centralized multipoint conferencing unit (MCU) to couple communication equipment at various conference sites. The MCU combines video, audio, and data streams from multiple endpoints into a single, multiple location, interactive session. Video conferencing systems developed by different suppliers often do not interoperate very well due to signaling and format mismatches between different endpoints.

BRIEF DESCRIPTION OF THE FIGURES

Corresponding reference characters indicate corresponding parts throughout the several views of the drawings.

DESCRIPTION OF EXAMPLE EMBODIMENTS

Overview

Figure 1:
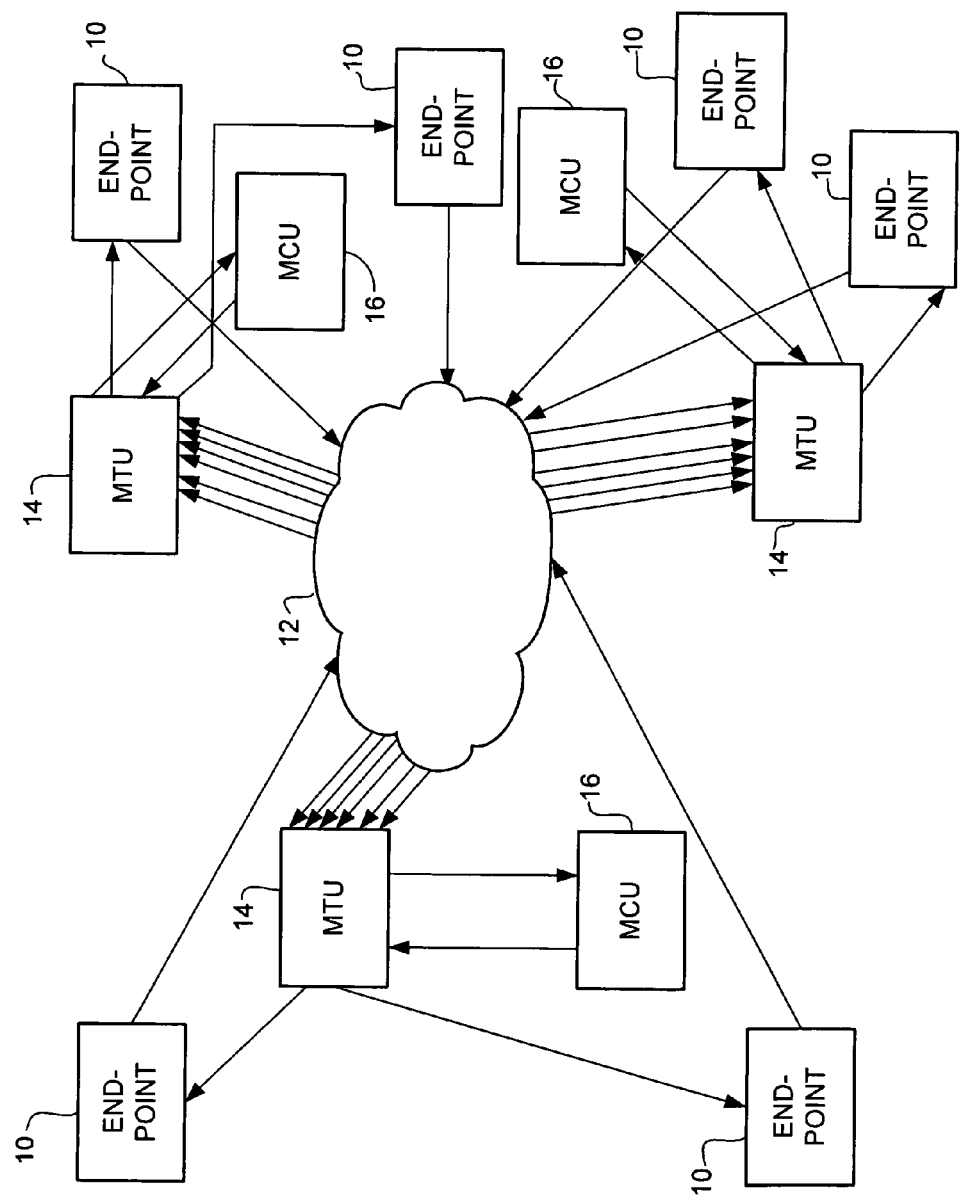
FIG. 1 illustrates an example of a network in which embodiments described herein may be implemented.

In one embodiment, a method generally comprises receiving at a multimedia transformation unit, media streams from a plurality of endpoints, transmitting audio components of the media streams to a multipoint conferencing unit, receiving an identifier from the multipoint conferencing unit identifying one of the media streams as an active speaker stream, processing at the multimedia transformation unit, a video component of the active speaker stream, and transmitting the active speaker stream to one or more of the endpoints without transmitting the video component to the multipoint conferencing unit.

In another embodiment, an apparatus generally comprises a processor configured to transmit media streams received from a plurality of endpoints to a multipoint conferencing unit, receive a plurality of redundant streams from the multipoint conferencing unit, decode two or more substreams generated from the redundant streams, identify a failure of one of the substreams, and utilize another one of the substreams in place of the failed substream. The apparatus further comprises memory for storing a redundancy parameter corresponding to a number of substreams decoded at the apparatus.

In yet another embodiment, an apparatus generally comprises an interface for receiving media streams from a multimedia transformation unit, the media streams transmitted from a plurality of endpoints, and a processor for interconnecting the endpoints in a conference session. The processor is configured for offsetting delivery of packets to the multimedia transformation unit to decorrelate channels at the multimedia transformation unit.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein provide an efficient implementation for joint deployment of a multipoint conferencing unit (multipoint control unit) (MCU) and multimedia transformation unit (MTU) to provide video conferencing. As described in detail below, one or more of the embodiments provide robustness through the use of redundant streams at the MTU or controlled delivery of packets at the MCU. One or more of the embodiments provide an optimization to increase capacity at the MTU or minimize bandwidth between the MCU and MTU.

The embodiments operate in the context of a data communications network including multiple network devices (nodes). Some of the devices in the network may be switches, routers, gateways, servers, call managers, service points, media sources, media receivers, MTUs, MCUs, or other network devices.

Referring now to the figures, and first to FIG. 1, an example of a network in which embodiments described herein may be implemented is shown. The network includes a plurality of endpoints (e.g., media sources/receivers) 10 in communication with one or more conferencing systems (MTU 14 and MCU 16) via network 12. The network 12 may include one or more networks (e.g., radio access network, public switched network, local area network, metropolitan area network, wide area network, enterprise network, Internet, intranet, or any other network). The nodes 10, 14, 16 are connected via communication links (wired or wireless). Media flow paths between the endpoints 10 may include any number or type of intermediate nodes (e.g., routers, switches, gateways, or other network devices), which facilitate passage of data between the endpoints.

The term 'conference' as used herein may include any communication session between a plurality of users transmitted using any audio or video means, including signals, data, or messages transmitted through voice or video devices. The term 'media' as used herein refers to video, audio, data, or any combination thereof (e.g., multimedia). The media may be encrypted, compressed, or encoded according to any format. The media content may be transmitted as streaming media or media files, for example.

The endpoints 10 are configured to originate or terminate communications over the network 12. The endpoints 10 may be any device or combination of devices configured for receiving, transmitting, or receiving and transmitting media flows. For example, the endpoint 10 may be a personal computer, media center device, mobile device (e.g., phone, personal digital assistant), or any other device capable of engaging in audio, video, or data exchanges within the network 12. The endpoints 10 may include, for example, one or more processor, memory, network interface, microphone, camera, speaker, display, keyboard, whiteboard, and video conferencing interface.

In the example shown in FIG. 1, the network includes an MTU 14 and MCU 16 for each conferencing system. One or more media streams or components of the streams received at the MTU 14 are processed and then forwarded to the MCU 16. The MCU 16 uses the streams to create a representation for the multi-location interactive session. The MTU 14 receives this representation from the MCU 16 and performs processing on the representation with the objective of tailoring it according to the capabilities and limitations of the associated endpoints 10. This representation is distributed to various endpoints 10 involved in the interactive session.

The MTU 14 enables different endpoints 10 to interoperate with one another by performing protocol and codec conversions on input streams from source endpoints 10 to create output streams that are well matched to destination endpoints. The MTU 14 shields any peculiarities or limitations of various endpoints 10 involved in the video conference session by performing all of the necessary processing in the network. The processing may include, for example, conversion from one codec format to another codec format, multimedia resampling, spatial resolution scaling for video streams, etc. The term 'multimedia transformation unit' as used herein refers to any network device configured for processing media streams received from two or more endpoints.

The MCU 16 is configured to manage a multi-party conference by connecting multiple endpoints 10 into the same conference. The MCU 16 collects audio and video signals transmitted by conference participants through their endpoints 10 and distributes the signals to other participants of the conference. The MCU 16 combines video, audio, and data streams into a single multi-location, interactive session. The term 'multipoint conferencing unit' as used herein refers to any network device configured for interconnecting a plurality of endpoints in a conference session.

It is to be understood that the network shown in FIG. 1 and described herein is only an example and that the embodiments described herein may be implemented in networks having different network topologies and network devices, without departing from the scope of the embodiments.

Figure 2:
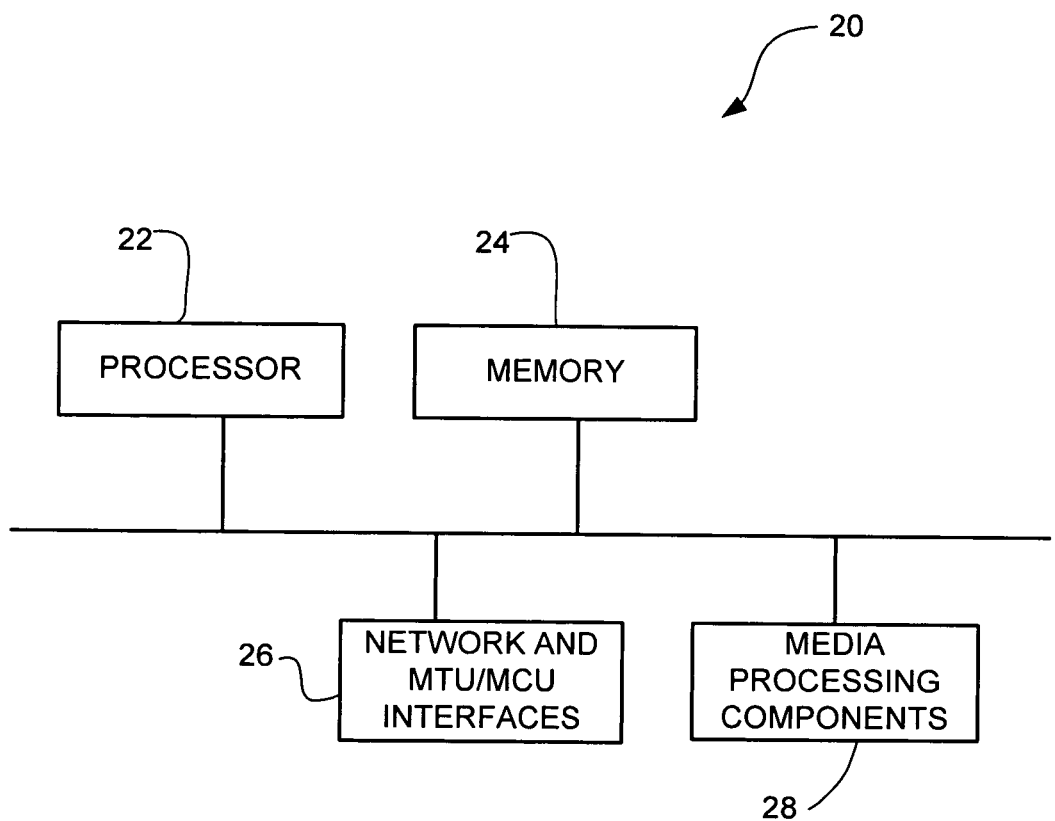
FIG. 2 depicts an example of a network device useful in implementing embodiments described herein.
Figure 3:
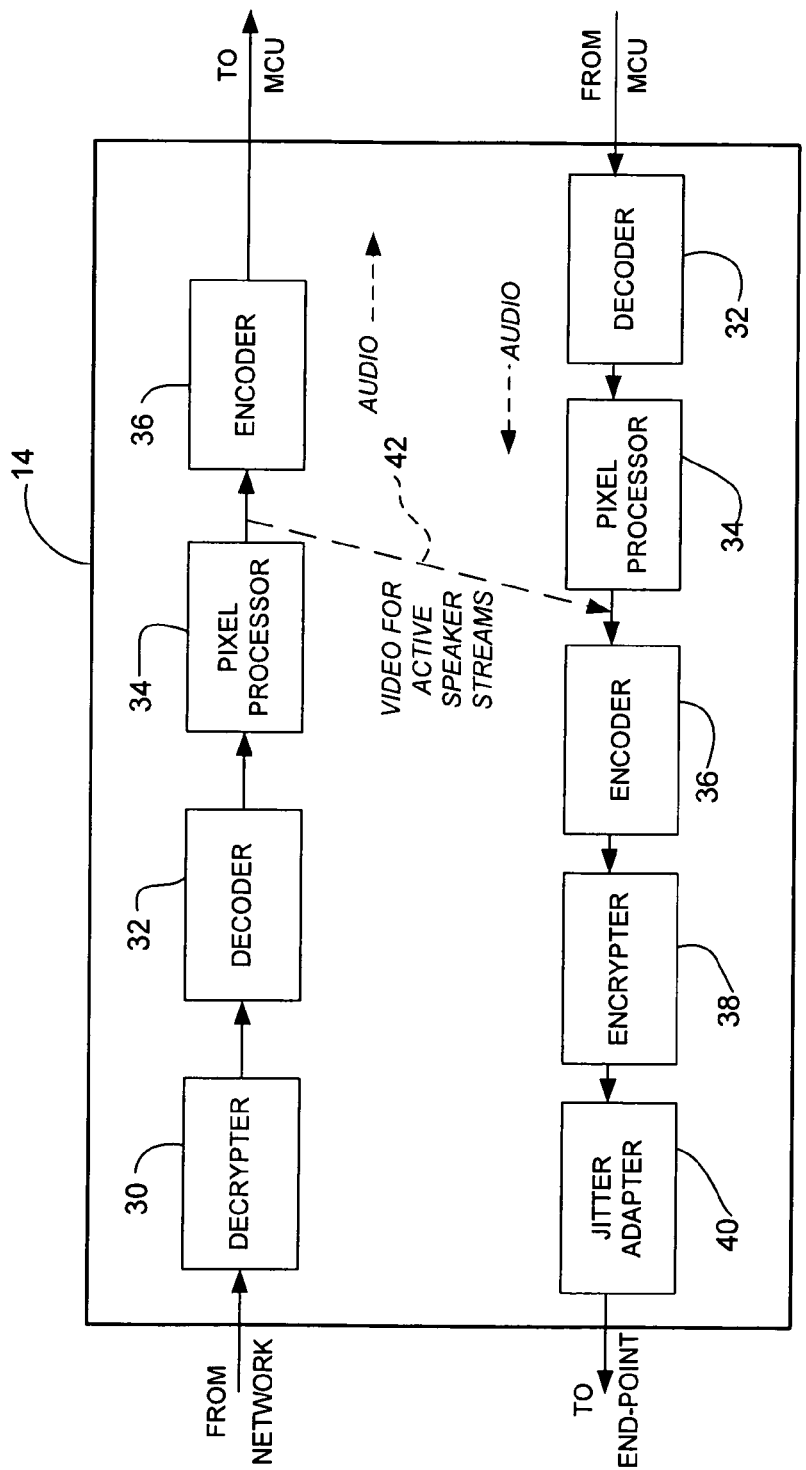
FIG. 3 is a block diagram illustrating details of a multimedia transformation unit (MTU), in accordance with one embodiment.
Figure 5:
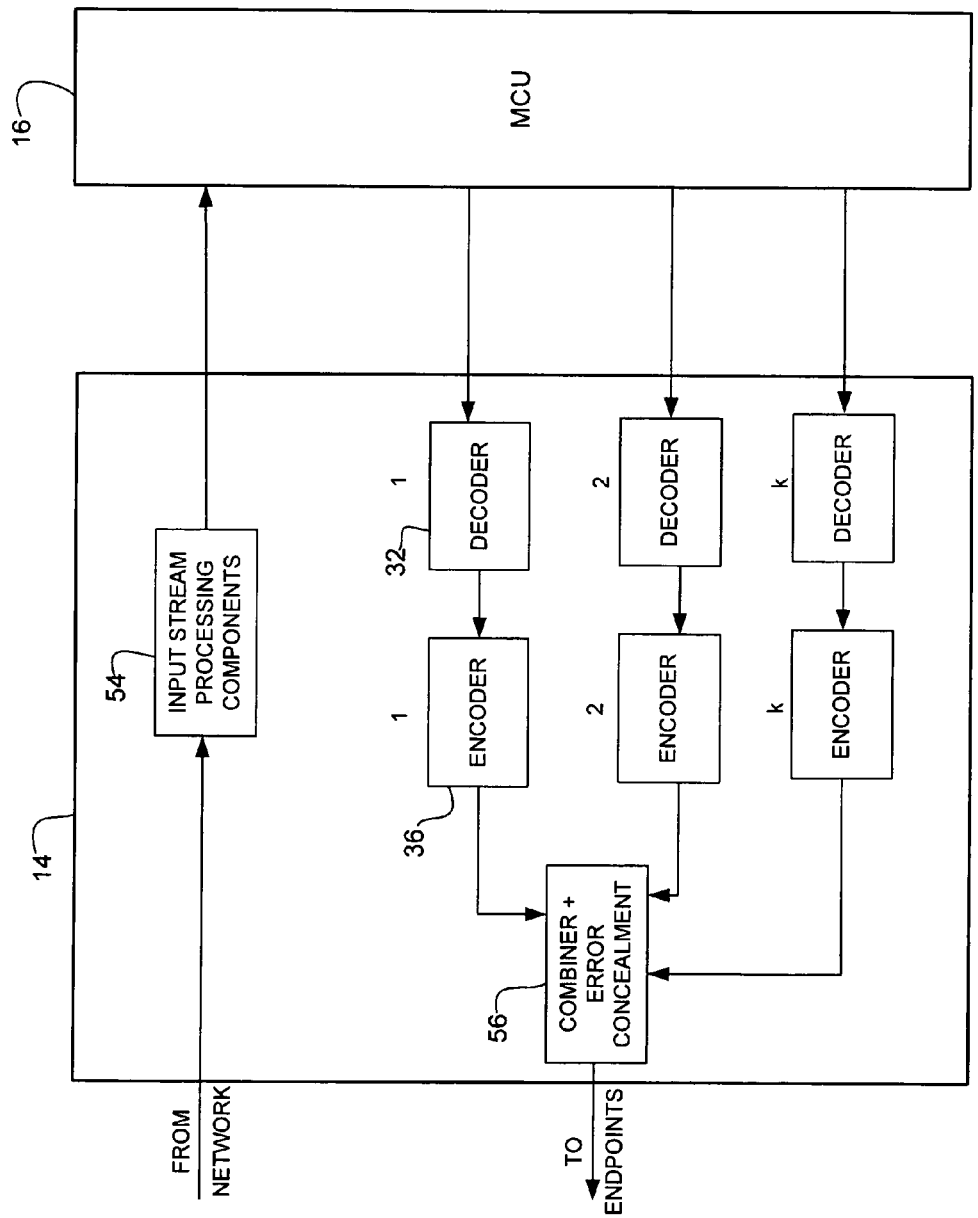
FIG. 5 is a block diagram illustrating an example for processing redundant streams at the MTU, in accordance with one embodiment.

An example of a network device 20 (e.g., MTU 14, MCU 16) that may be used to implement embodiments described herein is shown in FIG. 2. In one embodiment, network device 20 is a programmable machine that may be implemented in hardware, software, or any combination thereof. The device 20 includes one or more processors 22, memory 24, network and MTU/MCU interfaces 26, and one or more media processing components 28 (e.g., encoder, decoder, etc. as shown in FIGS. 3 and 5). Memory 24 may be a volatile memory or non-volatile storage, which stores various applications, modules, and data for execution and use by the processor 22.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

The network and MTU/MCU interfaces 26 may comprise one or more wireless or wired interfaces (linecards, ports) for receiving signals or data or transmitting signals or data to other devices. The interfaces 26 may include, for example, an Ethernet interface for connection to a computer or network.

The network device 20 may further include any suitable combination of hardware, software, algorithms, processors, devices, components, or elements operable to facilitate the conferencing capabilities described herein. It is to be understood that the network device 20 shown in FIG. 2 and described above is only one example and that different configurations of network devices may be used.

FIG. 3 illustrates an example of processing performed on a media stream by the MTU 14, in accordance with one embodiment. A top leg (as viewed in FIG. 3) illustrates a path taken by an input stream at the MTU 14, and a bottom leg illustrates a path taken by an output stream at the MTU. For simplification, only one input stream and one output stream are shown, however, any number of input streams or output streams may be processed at the MTU 14. The media stream (e.g., audio component, video component, audio and video components) received from the endpoint 10 is processed by a decrypter 30, decoder 32, pixel processor 34, and encoder 36 before being transmitted to the MCU 16. The stream received from the MCU 16 is processed by decoder 32, pixel processor 34, encoder 36, encrypter 38, and jitter adapter 40. It is to be understood that the processing components shown in FIG. 3 are only an example and that additional, fewer, or different processing components may be utilized at the MTU 14, without departing from the scope of the embodiments. Also, in one or more embodiments only a portion of the media stream may pass through one or more of the components. For example, one or more video components may follow path 42 and bypass the encoder 36 in the top leg of the MTU and decoder 32 and pixel processor 34 in the bottom leg of the MTU (as shown in FIG. 3), while the audio components pass through all of the processing components, as described below.

In one example, various outbound streams from disparate endpoints 10 with heterogeneous capabilities are combined into a single stream, with their audio components mixed and their video components composited together by the conferencing system. The top leg of the MTU 14 (FIG. 3) prepares the input streams for the MCU 16 by equalizing the heterogeneity (e.g., spatial and temporal resolution) of the various endpoints 10. The bottom leg of the MTU 14 then adapts the stream for the limitations and capabilities of the various endpoints 10. If the MCU 16 is incognizant of the presence of the MTU 14 between itself and the endpoints 10, it would transmit the composite stream individually to all of the endpoints 10, with each of the identical bit-streams being intercepted by the MTU 14 and tailored for the target endpoints 10. As described below, the embodiments described herein allow for interaction between the MTU 14 and MCU 16 to provide an efficient joint deployment of the MTU and MCU.

The MTU 14 serves as a proxy for the associated endpoints 10, terminating a logical connection between MCU 16 and an endpoint 10, and replacing it with two physical connections, one between the MCU 16 and MTU 14, and the second from the MTU to the corresponding endpoint. As a result, the transmission from the MCU 16 to the MTU 14 is highly redundant (i.e., many of the streams from the MCU are identical or close to identical). The following describes embodiments that use this redundancy to provide robustness in the conferencing system. The redundancy may be used as a means for providing N-to-1 redundancy, where N is equal to the number of redundant streams received from the MCU 16. In the following examples, a redundancy parameter (k) is used to identify the number of substreams (e.g., streams, substreams, sets of frames) processed at the MTU 14.

Figure 4:
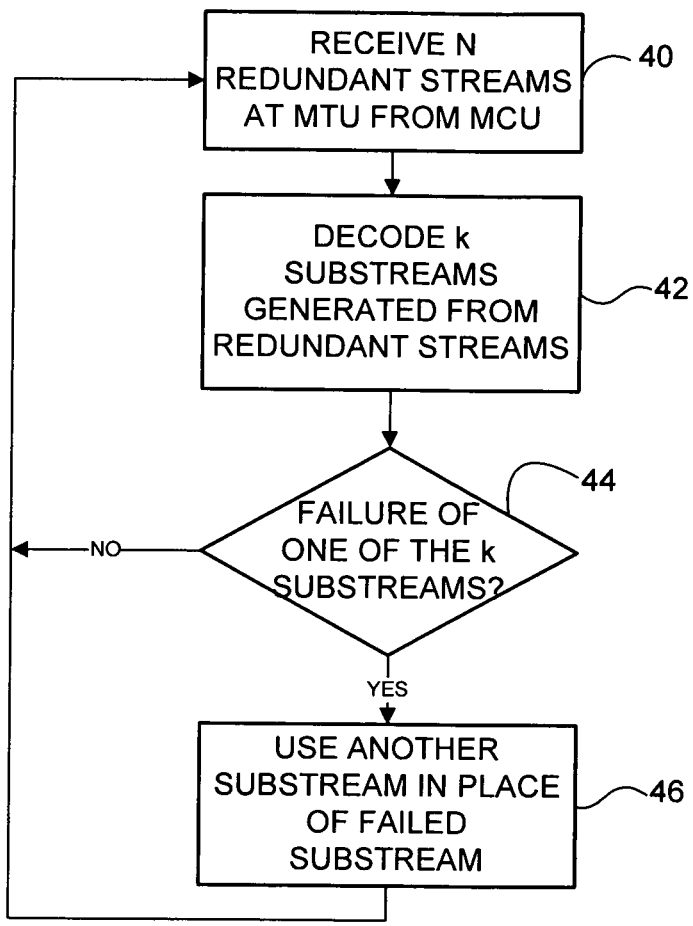
FIG. 4 is a flowchart illustrating a process for using redundant streams at the MTU to provide robustness, in accordance with one embodiment.

FIG. 4 is a flowchart illustrating a process for utilizing the redundancy at the MTU 14 to provide system robustness, in accordance with one embodiment. The MCU 16 transmits each of the redundant streams to the MTU 14 and the redundancy is used inside of the MTU to provide high availability. At step 40, the MTU 14 receives N redundant streams from the MCU 16. The MTU decodes k (e.g., two or more) substreams generated from the redundant streams, where k<=N (step 42). If one of the k substreams fails due to hardware or software unavailability (step 44), one of the other k streams is used in place of the failed stream (step 46).

In a first example, the substreams (k) comprise a subset of the N redundant streams received from the MCU 16. This provides k-to-1 redundancy at the expense of k−1 extra resources.

In a second example, the redundancy is used to provide forward error correction. For example, this may correspond to an (N, 1)-repetition code, where N−1 erasures may be corrected for. In this case, as long as 1 of the N streams is received, reliable packet delivery to the endpoint 10 can take place.

In a third example, each of the N streams is subsampled by a factor of k in the video domain. The redundancy prediction structure may be a temporally scalable structure, where given an input stream, each of the k substreams capture a mutually exclusive subsampled portion of the video that is downsampled by a factor of k. As shown in FIG. 5, data is received from the network and processed at input stream processing components 54. Upon receiving the N redundant streams from the MCU 16, the MTU 14 decodes any k streams which corresponds to an (N,k) forward error correction code. This is sufficient to recover the k redundant sets of frames (e.g., 1, 2, 3, . . . k, as shown in FIG. 5). Furthermore, if one of these k substreams fails, then the other k−1 substreams may be used with an error concealment algorithm 56 to provide the reconstructed stream to all of the endpoints 10. As long as not all of the k substreams fail, then a version of the input stream may be provided to the appropriate endpoint 10 by the MTU 14.

Figure 6:
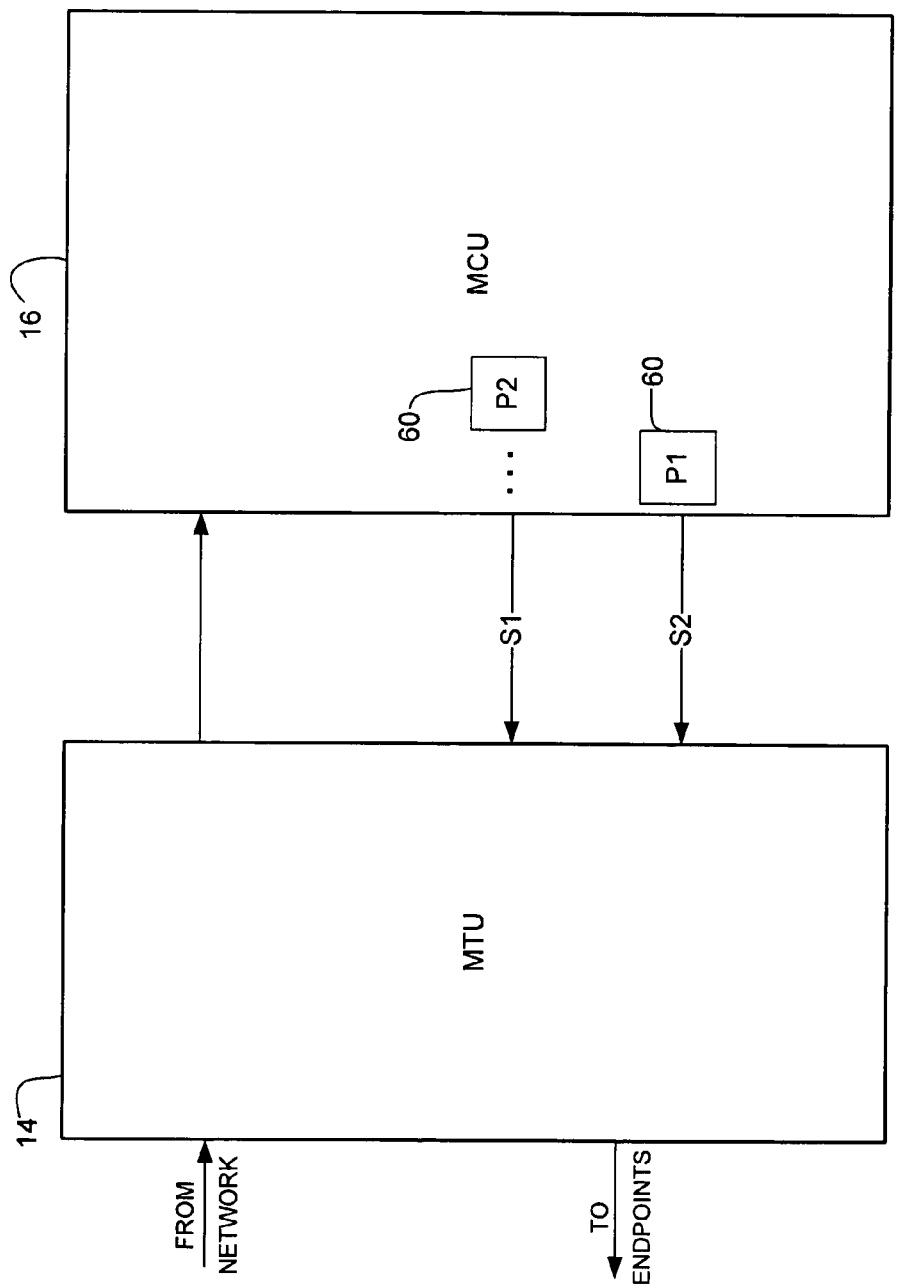
FIG. 6 is a block diagram illustrating optimization at a multipoint conferencing unit (MCU), in accordance with one embodiment.

FIG. 6 illustrates embodiments implemented at the MCU 16 to provide robustness. In a first example shown in FIG. 6, the MCU 16 offsets (i.e., staggers) delivery of packets 60 to decorrelate channels to the MTU 14 in case that the channels from MCU to MTU consist of paths that traverse similar routes. This prevents congestion or losses within the network.

In a second example, the MCU 16 is configured to only send non-redundant streams with appropriate side-information that enables the MTU 14 to choose streams appropriately for various endpoints 10. The communication bandwidth between the MCU 16 and MTU 14 is therefore reduced. For example, if S1 and S2 are redundant streams, the MCU 16 would only send one of the streams (e.g., only S1 or S2) to the MTU 14 (FIG. 6). In one embodiment, the MTU 14 communicates to the MCU 16 the number of streams to transmit.

Figure 7:
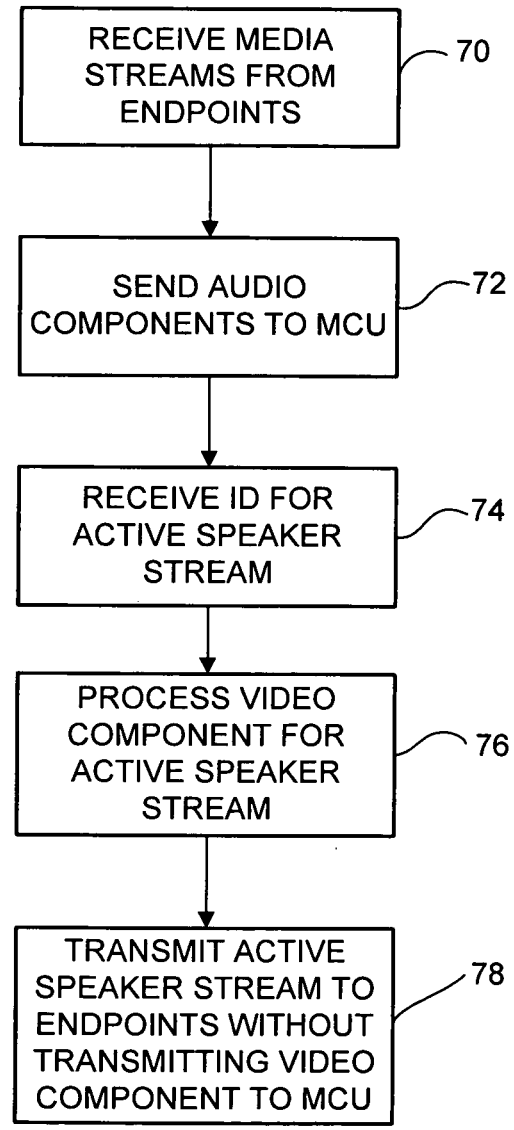
FIG. 7 is a flowchart illustrating a process for MTU optimization, in accordance with one embodiment.

In another embodiment, the MTU 14 and MCU 16 implementation is optimized for use with active speaker based stream selection. FIG. 7 is a flowchart illustrating active speaker based optimization at the MTU 14, in accordance with one embodiment. At step 70, the MTU 14 receives media streams from endpoints 10. The MTU 14 equalizes the audio components of the media streams received from various endpoints 10 to a common format that can be processed by the MCU 16 and sends the audio components of the streams to the MCU (step 72). The MCU 16 uses the audio components of the media streams from various endpoints 10 to identify the stream associated with the current active speaker at one of the endpoints. The MCU 16 identifies the current active speaker and communicates this information to the MTU 14. The MTU 14 receives an identifier for the active speaker stream at step 74. The MTU 14 processes (e.g., decodes, encodes) the video component for the active speaker stream identified by the MCU 16 (step 76). The MTU 14 preferably maintains in memory a list of one or more previously active speaker streams so that the MTU 14 can also process the previously active speaker streams for distribution to one or more of the endpoints 10.

The MTU 14 transmits the media streams to the endpoints without transmitting the video component to the multipoint conferencing unit (step 78). For example, the video components that are processed at the MTU 14 may follow path 42 shown in FIG. 3. The MTU 14 may choose to only perform processing on the uncompressed stream data corresponding to the currently active speaker stream and a specified number of previously active speaker streams (e.g., 0, 1, 2, . . . ). The remaining video components (e.g., video components of media streams that are not identified as currently or previously active speaker streams) may be dropped at the MTU 14. The MTU 14 may transmit, for example, the media stream corresponding to the currently active speaker to all of the endpoints 10 except for the currently active speaker and transmit the stream corresponding to the last active speaker to the currently active speaker.

Transmission bit-rates for the audio component are significantly less than those for the video component and the active speaker stream identifier that is transmitted from the MCU 16 to the MTU 14 is an ultra-low bit-rate communication. Therefore, significant bandwidth savings are realized in the communication between the MTU 14 and MCU 16 by eliminating communication of the video components to the MCU. Furthermore, bypassing of additional encoding and decoding for the video components at the MTU 14, as shown in FIG. 3, and dropping video components of streams that are not currently or previously active speaker streams increase available capacity at the MTU.

The embodiments described herein may be implemented independent from one another or more than one embodiment may be implemented together.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. An apparatus comprising:
a processor configured to transmit media streams received from a plurality of endpoints to a multipoint conferencing unit, receive a plurality of redundant streams from the multipoint conferencing unit, decode two or more substreams generated from the redundant streams, identify a failure of one of said substreams, and utilize another one of said substreams in place of said failed substream; and memory for storing a redundancy parameter corresponding to a number of said substreams decoded at the apparatus;

wherein the redundancy parameter is less than the number of redundant streams received from the multipoint conferencing unit.

2. The apparatus of claim 1 wherein the processor is configured to apply an error concealment algorithm to said substreams to generate a reconstructed stream for transmittal to said plurality of endpoints.

3. The apparatus of claim 1 wherein the processor is configured to perform forward error correction.

4. The apparatus of claim 1 wherein the apparatus is a multimedia transformation unit.

5. The apparatus of claim 1 wherein said substreams comprise a subset of the redundant streams received from the multipoint conferencing unit.

6. The apparatus of claim 1 wherein each of said substreams comprises a set of frames from the redundant streams.

7. An apparatus comprising:

a processor configured to transmit media streams received from a plurality of endpoints to a multipoint conferencing unit, receive a plurality of redundant streams from the multipoint conferencing unit, decode two or more substreams generated from the redundant streams, identify a failure of one of said substreams, and utilize another one of said substreams in place of said failed substream; and memory for storing a redundancy parameter corresponding to a number of said substreams decoded at the apparatus;

wherein each of the redundant streams received from the multipoint conferencing unit is subsampled by a factor corresponding to the redundancy parameter to generate said substreams.

8. The apparatus of claim 7 wherein the processor is configured to apply an error concealment algorithm to said substreams to generate a reconstructed stream for transmittal to said plurality of endpoints.

9. The apparatus of claim 7 wherein the processor is configured to perform forward error correction.

10. The apparatus of claim 7 wherein the apparatus is a multimedia transformation unit.

11. The apparatus of claim 7 wherein said substreams comprise a subset of the redundant streams received from the multipoint conferencing unit.

12. The apparatus of claim 7 wherein each of said substreams comprises a set of frames from the redundant streams.

13. The apparatus of claim 7 wherein the redundancy parameter is less than the number of redundant streams received from the multipoint conferencing unit.

* * * * *